United States Patent [19]

Henke

[11] 4,024,377
[45] May 17, 1977

[54] HOT WELL AND METHOD OF HEATING

[75] Inventor: Mitchell C. Henke, Fort Wayne, Ind.

[73] Assignee: Lincoln Manufacturing Company, Inc., Fort Wayne, Ind.

[22] Filed: Sept. 10, 1975

[21] Appl. No.: 612,258

[52] U.S. Cl. .............................. 219/439; 29/611; 219/430; 219/530

[51] Int. Cl.² ........................................ F27D 11/02

[58] Field of Search ............ 21/225, 341, 343, 415, 21/430, 432, 433, 438, 439, 441, 530, 540; 165/104, 183; 126/246, 400; 99/331; 29/611

[56] References Cited

UNITED STATES PATENTS

| | | | |
|---|---|---|---|
| 1,034,268 | 7/1912 | McCord | 126/400 |
| 1,776,304 | 9/1930 | Vannier | 219/429 |
| 2,480,337 | 8/1949 | Pearce | 219/415 |
| 2,889,443 | 6/1959 | Dobmeier | 219/433 X |
| 2,992,314 | 7/1961 | Drugmand et al. | 219/535 |
| 3,031,735 | 5/1962 | Jepson | 29/611 |
| 3,095,498 | 6/1963 | Foster | 219/441 |
| 3,508,485 | 4/1970 | Munsey | 99/331 |

Primary Examiner—Volodymyr Y. Mayewsky
Attorney, Agent, or Firm—Albert L. Jeffers; Roger M. Rickert

[57] ABSTRACT

A hot well, especially for food, and a method of heating the well in which an electric heating element is supported beneath the bottom of the well while a heat sink in the form of a U-shaped member formed of a highly heat conductive metal, such as aluminum, is fitted over the well from below. The U-shaped member has a bottom part beneath the heating element and side parts which are parallel to and in intimate heat exchange relation with the sides of the well. Energization of the heating element directly heats the bottom of the well, principally by radiation directly from the heater and by radiation reflected from the bottom part of the U-shaped member. The bottom part of the U-shaped member also absorbs heat from the heating element and, by conduction upwardly along the side parts of the U-shaped member, heat is also supplied to the sides of the well.

10 Claims, 4 Drawing Figures

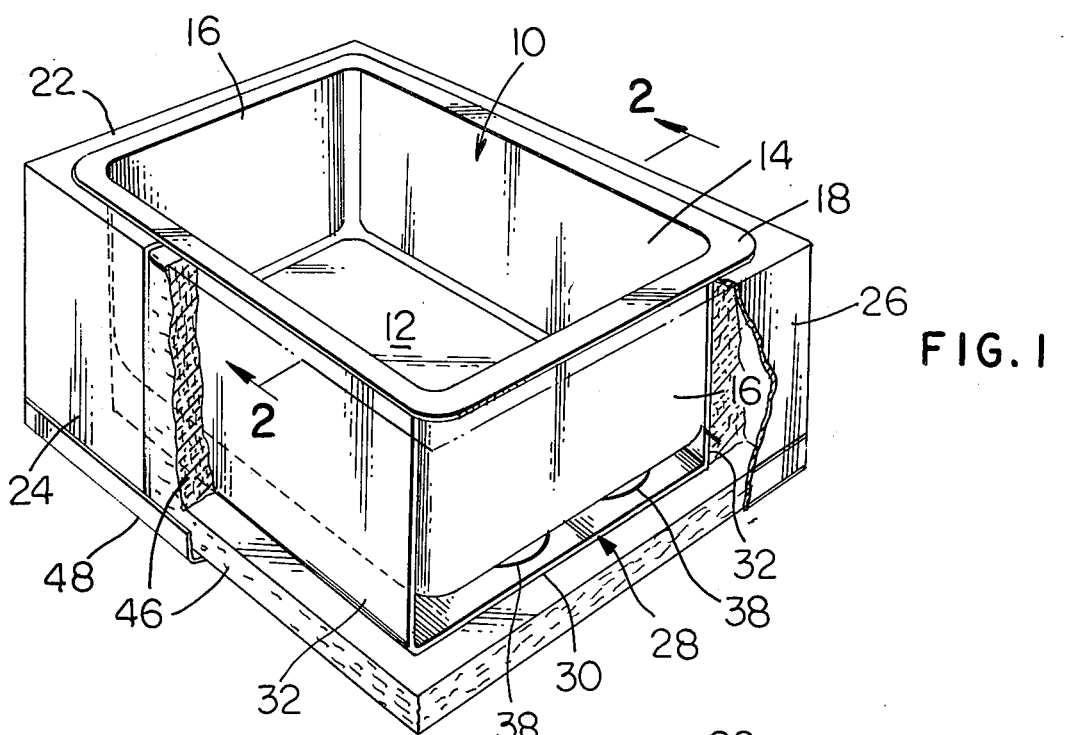
FIG. 1
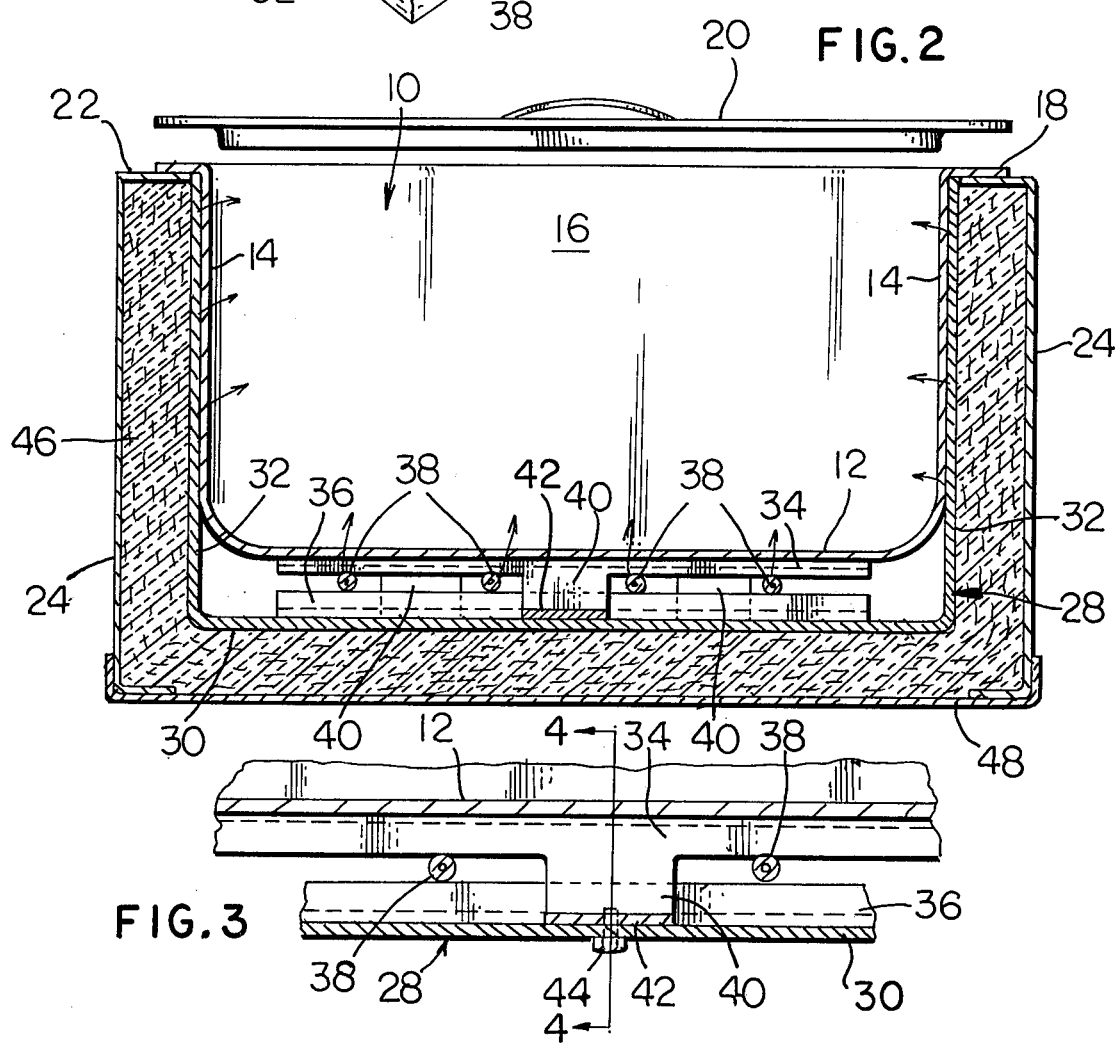
FIG. 2
FIG. 3

HOT WELL AND METHOD OF HEATING

The present invention relates to hot wells, especially for food, and is particularly concerned with a hot well of improved construction and embodying a new method of supplying heat to the well.

Hot wells are well-known in the art of handling hot foods and, in general, comprise a member forming a well and some arrangement for supplying heat thereto. For reasons of appearance, sanitation and durability, the members forming the well are usually formed of stainless steel as by deep drawing of a sheet of stainless steel to form the well. As is also known, stainless steel has a relatively low coefficient of heat conductivity as compared with certain other metals such as aluminum.

It is also known that supplying heat only to the bottom of a hot well member of the nature referred to, especially when the member is stainless steel, can leave the upper region of the well member insufficiently heated. When the well is uncovered, as during serving, the food in the upper portion of the well may become too cool for serving purposes due to loss of heat to the atmosphere in combination with the slow rate at which heat is supplied to the upper region of the well.

With the foregoing in mind, a primary objective of the present invention is the provision of a hot well, especially for food, and a method of heating the well, in which the problems referred to above are relieved, or eliminated.

A particular object of the present invention is the provision of a hot well in which heat is supplied to the bottom of the well and also to the sides thereof to maintain a more uniform temperature within the well.

BRIEF SUMMARY OF THE INVENTION

According to the present invention, a hot well structure is provided in which a well member —which may be a deep drawn stainless steel member —is mounted in a frame having side and end walls depending about the sides and ends, especially, of the well member.

A heat sink, preferably formed of aluminum or another corrosion-resistant metal having a relatively high coefficient of heat conductivity, is provided and is telescoped over the well member from below. The heat sink member is generally U-shaped and has a bottom part parallel to and spaced from the bottom of the well member and side parts parallel to and engaging the sides of the well member in intimate heat exchange relation.

An electric heating element, preferably metal clad, is disposed in the space between the bottom of the well member and the bottom part of the U-shaped heat sink member. Bracket means and positioning elements secured to the well member and the U-shaped member clamp the electric heating element in place in the aforementioned space.

A blanket of heat insulating material, preferably free of metal content, extends over the outside of the bottom part of the U-shaped member and upwardly between the side parts of the U-shaped member and the side walls of the frame. A bottom cover member is secured to the bottom of the frame and encloses the heat-insulating material.

When the electric heater is energized, heat is supplied to the bottom of the well member by direct radiation and by radiation reflected from the bottom part of the U-shaped member and by convection due to the air in the space occupied by the heating element. Simultaneously, however, heat also flows from the bottom part of the U-shaped member up the side parts of the U-shaped member and into the sides of the well member. The heat thus supplied by conduction to the sides of the well member provides for more uniform heating of the well member while also providing for more efficient utilization of the energy supplied to the heating element.

The nature of the present invention and the objects and advantages thereof will become more apparent from the following detailed description taken with the accompanying drawings in which:

FIG. 1 is a perspective view, partly broken away, showing a hot well structure according to the present invention.

FIG. 2 is a transverse section indicated by line 2—2 on FIG. 1.

FIG. 3 is a fragmentary view showing how the heating element is located and clamped.

Figure 4:
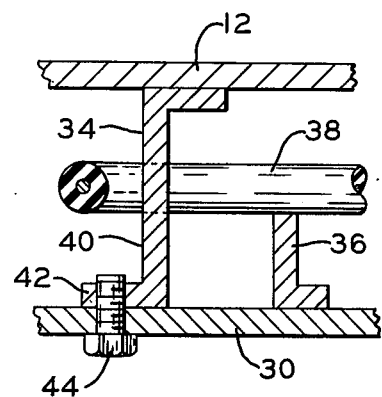
FIG. 4 is a sectional view similar to FIG. 3 but normal thereto.

DETAILED DESCRIPTION OF THE INVENTION:

Referring to the drawings more in detail, the hot well structure according to the present invention has a well member or heating vessel 10 which is, advantageously, a deep drawn stailess steel or aluminum member having a bottom wall 12, side wall 14, and end walls 16. Heating vessel 10 may have a peripheral flange 18 about the open upper end. FIG. 2 shows a lid 20 that can be provided for closing the upper end of the well member.

The structure includes a frame having a top flange 22 that engages beneath and may be secured to flange 18 of the heating vessel 10. The frame includes side walls 24 and end walls 26. The side and end walls of the frame are spaced from the sides and ends of heating vessel 10.

A heat sink, generally indicated by reference numeral 28, is provided and telescopically engages heating vessel 10 from the bottom of the well member. Heat sink 28, which is advantageously heavy gauge aluminum, has a bottom part 30 parallel to and spaced from bottom 12 of heating vessel 10. The heat sink is in the form of a U-shaped member and has side parts 32 upstanding from the side edges of bottom part 30. Side parts 32 are parallel to and in engagement with substantially the full height of side walls 14 of heating vessel 10 and are, thus, in intimate heat exchange relation with side 14 of the heating vessel.

Lateral bracket members 34, only one being shown in FIGS. 2 and 3, are fixed to the underside of bottom 12 of heating vessel 10 near the ends of the heating vessel and one or more lateral bracket members 36 are fixed to the upper side of the bottom part 30 of heat sink 28. As will be seen in FIGS. 2 and 3, the bracket members 34 and 36 may be in the form of angles welded, or otherwise affixed, to the respective supporting members.

The bracket members clamp therebetween a metal clad heating element 38 which is made of spaced parallel longitudinal reaches interconnected at the ends by curved portions. One end of each of the two outer reaches forms a respective terminal for the heating element for the supply of electrical energy thereto in a conventional manner.

Positioning elements are provided which are received inside the curved portions of the heating element near the ends thereof to locate the heating element and to prevent shifting of the heating element. These positioning elements are indicated at 40 in FIG. 2 and one thereof is shown in FIG. 3. These elements may be fixed to, or form a part of, the bracket members 34 carried on the bottom of heating vessel 10 near the ends thereof.

The elements may have tabs on the lower ends of which one is indicated at 42 in FIG. 3. The tabs may be availed of for receiving flat head screws 44 extending through oversize holes in the bottom part 30 of heat sink 28 whereby the heat sink is fixed in place in the assembly while the oversize holes permit expansion and contraction of the heat sink relative to the heating vessel without buckling.

A blanket of heat insulating material 46 is provided which extends over the underside of bottom part 30 of heat sink 28 and upwardly along the side parts 32 thereof between the side parts 32 and side walls 24 of the frame.

Finally, a bottom cover member 48 is secured to the bottom of the frame, as by screws, and closes the bottom of the frame and encloses the exposed surface of the heat insulating material 46.

In practice, the frame of the structure might be about 6 inches deep by about 12 inches wide from side to side and about 20 inches long. The heating vessel 10 is, of course, formed to smaller dimensions so as to fit into the frame with clearance from the side and end walls of the frame.

The heat sink 28, which is formed of aluminum thicker than the aluminum or stainless steel of the heating vessel may be about 10 inches from side to side and have side parts or walls up to about 5 inches high.

In operation, the heating element is energized to supply heat to the heating vessel. The bottom of the heating vessel receives heat by radiation from the heating element and by radiation reflected from the bottom part of the heat sink and by connection due to circulation of air between the bottom of the heating vessel and the bottom part of the heat sink.

The side walls of the heating vessel, on the other hand, receive heat by conduction from the side parts of the heat sink which, in turn, receive heat principally from the bottom part of the heat sink which is, of course, heated by the electric heater.

What is claimed is:

1. In a hot well, especially for food; an upwardly opening heating vessel of heat conducting material having a bottom, side and end walls, a heating element supported beneath said bottom wall for supplying heat thereto at least partly by radiation, a heat sink of good heat conducting material in the form of a U-shaped metal member having a bottom part beneath said heating element and side parts extending upwardly along and engaging the side walls in heat exchange relation, said U-shaped member receiving heat from said heating element and supplying heat to said walls by conduction, a frame connected to the peripheral region of the top of said vessel and having side walls and end walls extending downwardly along the sides and ends respectively of said vessel in spaced relation thereto, a blanket of heat insulation extending over at least the underside of the bottom part of said U-shaped metal member and upwardly between the side parts thereof and the side walls of said frame, and a bottom cover connected to the bottom of said frame and enclosing said heat insulation from below.

2. A hot well according to claim 1 which includes bracket means dependent from the underside of the bottom of said vessel and upstanding from the upper side of the bottom part of said U-shaped member and between which bracket means the said heating element is clamped.

3. A hot well according to claim 1 which includes bracket means dependent from the underside of the bottom of said vessel and upstanding from the upper side of the bottom part of said U-shaped member, said heating element comprising a metal clad electric heating element electrically insulated from the vessel and from the U-shaped member, said heating element extending in a sinous path and having reaches substantially at right angles to said bracket means and clamped therebetween.

4. A hot well according to claim 1 which includes bracket means dependent from the underside of the bottom of said vessel and upstanding from the upper side of the bottom part of said U-shaped member, said heating element comprising a metal clad electrically insulated electric heating element extending in a sinuous path and having reaches substantially at right angles to said bracket means and clamped therebetween, at least one end of each reach being connected to an adjacent reach by a semicircular portion of the heating element, and positioning elements stationarily mounted in the space occupied by the heating element and near said semicircular portions for preventing shifting of the heating element between said well and said U-shaped member.

5. A hot well according to claim 1 which includes lateral first bracket means dependent from the underside of the bottom of said vessel near the ends thereof and lateral second bracket means upstanding from the upper side of the bottom part of said U-shaped member, said heating element means comprising a metal clad electrically insulated electric heating element having laterally spaced longitudinal reaches clamped between said bracket means and connected at the ends by curved end portions, at least one of said bracket means including positioning portions near and inside the curved end portions of said heating element to prevent the heating element from shifting.

6. A hot well according to claim 5 in which said positioning elements are on the said first bracket means and extend to near said bottom part of said U-shaped member, and means connecting said U-shaped member to said positioning elements.

7. A hot well according to claim 1 in which said well is stainless steel and said U-shaped member is aluminum.

8. A hot well according to claim 1 in which said U-shaped member is thicker than the material from which said well is formed.

9. The method of supplying heat to a heating vessel which comprises; supporting an electric heating element beneath and parallel to the bottom wall of the vessel, placing a U-shaped member with the bottom part parallel to and beneath the heating element and with the side parts engaging the side walls of the vessel in heat exchange relation therewith, electrically insulating the heating element from the vessel and the U-shaped member, energizing the heating element to supply heat from the heating element to the bottom wall of the vessel principally by direct radiation and by radiation reflected by the bottom part of the U-shaped member and simultaneously supplying heat to the side walls of the vessel by conduction of heat along the side parts of the U-shaped member from the bottom thereof, and thermally insulating the heating vessel and the U-shaped metal member by enclosing the bottom part and side parts of the U-shaped metal member and the bottom wall and the side walls of the heating vessel with a heat insulating blanket.

10. The method according to claim 9 which includes supporting said heating element in spaced relation to the bottom of said well and to the bottom part of said U-shaped member.

* * * * *

UNITED STATES PATENT AND TRADEMARK OFFICE
CERTIFICATE OF CORRECTION

PATENT NO. : 4,024,377
DATED : May 17, 1977
INVENTOR(S) : Mitchell C. Henke

It is certified that error appears in the above-identified patent and that said Letters Patent are hereby corrected as shown below:

Col. 2, line 28, "stailess" should be -- stainless --

Col. 2, line 29, "side wall 14" should be -- side walls 14 --

Col. 2, line 41, "well member" should be -- heating vessel --

Col. 3, line 58 (Claim 1) "side" omitted between "said" and "walls"

Col. 4, line 59 (Claim 9) "metal" omitted between "U-shaped" and "member"

Col. 5, lines 2 and 3 (Claim 9) "part" omitted between "bottom" and "thereof"

Signed and Sealed this ninth Day of August 1977

[SEAL]

Attest:

RUTH C. MASON
*Attesting Officer*

C. MARSHALL DANN
*Commissioner of Patents and Trademark*